(12) United States Patent
Ho

(10) Patent No.: US 7,803,075 B2
(45) Date of Patent: Sep. 28, 2010

(54) VEHICLE TRANSMISSION

(75) Inventor: Chao-Chang Ho, Feng-Shan (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 124 days.

(21) Appl. No.: 11/738,094

(22) Filed: Apr. 20, 2007

(65) Prior Publication Data

US 2008/0103017 A1 May 1, 2008

Related U.S. Application Data

(63) Continuation-in-part of application No. 11/588,507, filed on Oct. 27, 2006.

(51) Int. Cl.
| F16H 55/56 | (2006.01) |
| F16H 59/00 | (2006.01) |
| F16H 61/00 | (2006.01) |
| F16H 63/00 | (2006.01) |

(52) U.S. Cl. .............................. 474/8; 474/18; 474/28
(58) Field of Classification Search ............... 474/8–28; 123/48 R
See application file for complete search history.

(56) References Cited

U.S. PATENT DOCUMENTS

| 4,583,423 | A | * | 4/1986 | Hahne ......................... 475/136 |
| 4,834,031 | A | * | 5/1989 | Katoh et al. .............. 123/48 R |
| 5,725,446 | A | * | 3/1998 | Kaku et al. .................... 474/13 |
| 6,336,878 | B1 | * | 1/2002 | Ehrlich et al. ................. 474/28 |
| 6,565,465 | B2 | * | 5/2003 | Nishigaya et al. ............. 474/28 |
| 7,243,564 | B2 | * | 7/2007 | Chonan et al. ................ 74/329 |
| 2004/0018903 | A1 | * | 1/2004 | Takagi ............................ 474/8 |
| 2004/0077444 | A1 | * | 4/2004 | Kanda et al. .................... 474/8 |
| 2004/0089494 | A1 | * | 5/2004 | Fukuda ........................ 180/377 |
| 2005/0016491 | A1 | * | 1/2005 | Leiber et al. ............. 123/197.4 |
| 2006/0063625 | A1 | * | 3/2006 | Emizu et al. ................ 474/110 |

* cited by examiner

*Primary Examiner*—John Q. Nguyen
*Assistant Examiner*—Robert T Reese
(74) *Attorney, Agent, or Firm*—Christensen O'Connor Johnson Kindness PLLC

(57) ABSTRACT

A vehicle transmission includes a crankshaft extending through a seal cover and into an oil-storing end portion of a driven shaft. The oil-storing end portion of the driven shaft defines a lubricating space filled with lubricating oil, and extends into the seal cover. A unidirectional clutch is disposed in the lubricating space and outwardly of the seal cover.

16 Claims, 4 Drawing Sheets

VEHICLE TRANSMISSION

CROSS-REFERENCE TO RELATED APPLICATION

This application is a continuation-in-part (CIP) of co-pending U.S. patent application Ser. No. 11/588,507, filed by the applicant on Oct. 27, 2006.

BACKGROUND OF THE INVENTION

1. Field of the Invention

This invention relates to a vehicle transmission, and more particularly to a vehicle transmission that includes a wet clutch installed on a crankshaft.

2. Description of the Related Art

Referring to FIG. 1, a conventional vehicle transmission 1 is adapted to transmit power from an engine of a vehicle, such as an all-terrain vehicle, a motorcycle, etc., to a rear wheel (not shown) of the vehicle. The conventional vehicle transmission 1 includes a crankshaft box unit 12 driven by the engine, a clutch unit 13 disposed in proximity to the crankshaft box unit 12, and a transmission box unit 14 disposed in proximity to the clutch unit 13.

The crankshaft box unit 12 includes a crankshaft box 121, a crankshaft 122 disposed in the crankshaft box 121 and rotatable by the engine, a driven shaft 123 having two ends connected respectively and pivotally to the crankshaft 122 and a transmission box 140 of the transmission box unit 14, a first bearing 124 disposed between the transmission box 140 and the driven shaft 123, and a self-lubricating bearing 125 sleeved on the driven shaft 123. The crankshaft 122 has two oil passages 126 that permit flow of lubricating oil therethrough.

The clutch unit 13 includes a seal cover 131 cooperating with the crankshaft box 121 of the crankshaft box unit 12 to define a clutch chamber 130, a wet clutch 132 sleeved on and rotatable with the crankshaft 122, an outer shield 133 sleeved on the crankshaft 122 for covering the wet clutch 132, a sleeve body 134 disposed between the driven shaft 123 and the outer sleeve 133 and connected fixedly to the outer shield 133 by a plurality of rivets 137 (only two are shown), a second bearing 135 disposed between the sleeve body 134 and the crankshaft 122, and a unidirectional clutch 136 for controlling unidirectional rotation of the wet clutch 132 and lubricated by the lubricating oil flowing from the oil passages 126 in the crankshaft 122. The driven shaft 123 extends through the seal cover 131, and is coupled with the sleeve body 134. When the rotational speed of the wet clutch 132 reaches a predetermined speed, the wet clutch 132 comes into frictional contact with the outer shield 133 so as to rotate an assembly of the outer shield 133, the sleeve body 134, and the driven shaft 123.

The transmission box unit 14 includes a driving pulley unit 141 sleeved on the driven shaft 123, a coupling shaft (not shown) connected fixedly to the rear wheel, a driven pulley unit (not shown) sleeved on the coupling shaft, and a V-belt 143 trained on the driving pulley unit 141 and the driven pulley unit so as to transfer rotation of the driving pulley unit 141 to the driven pulley unit. When the driven shaft 123 rotates at a speed smaller than a threshold speed, the pitch diameter of the driving pulley unit 141 is smaller than that of the driven pulley unit. In this state, the rotational speed of the rear wheel is lower than that of the driven shaft 123. When the driven shaft 123 rotates at a speed greater than the threshold speed, the pitch diameter of the driving pulley unit 141 is greater than that of the driven pulley unit. In this state, the rotational speed of the rear wheel is greater than that of the driven shaft 123.

When the engine is in an idle speed condition, although the crankshaft 122 and the wet clutch 132 rotate, the wet clutch 132 is spaced apart from the outer shield 133. As such, power cannot be transmitted from crankshaft 122 to the driven shaft 123 and, thus, the rear wheel. When a throttle is operated to increase the rotational speed of the crankshaft 122 and the wet clutch 132, the wet clutch 132 engages the outer shield 133 so as to allow for transmission of power from the crankshaft 122 to the driven shaft 123. When the engine is in an acceleration condition, the pitch diameter of the driving pulley unit 141 increases, while the pitch diameter of the driven pulley unit is reduced, thereby resulting in an increase in the rotational speed of the rear wheel. When the engine is in a deceleration condition, the pitch diameter of the driving pulley unit 141 reduces, while the pitch diameter of the driven pulley unit is increased, thereby resulting in a decrease in the rotational speed of the rear wheel.

The aforesaid conventional vehicle transmission 1 suffers from the following disadvantages:

(1) Since the crankshaft 122 and the driven shaft 123 are coupled to each other at a position between the wet clutch 132 and the outer shield 133, many elements need to cooperate with the crankshaft 122, the driven shaft 123, the wet clutch 132, and the outer shield 133 in a highly precise manner. This results in difficulties with respect to assembly of these elements.

(2) The lubricating oil flows onto the unidirectional clutch 136 and other rotating parts through the oil passages 126 in the crankshaft 122. However, a space between the unidirectional clutch 136 and the sleeve body 134 is too small to be filled with sufficient lubricating oil. This results in unsmooth rotation of the unidirectional clutch 136.

SUMMARY OF THE INVENTION

The object of this invention is to provide a vehicle transmission that can be assembled easily and that has a lubricating arrangement capable of providing sufficient lubrication to a unidirectional clutch.

According to this invention, there is provided a vehicle transmission comprising:

a crankshaft box unit including a crankshaft box and a crankshaft journalled within the crankshaft box;

a clutch unit disposed in proximity to the crankshaft box unit and including a seal cover cooperating with the crankshaft box to define a clutch chamber therebetween, a wet clutch disposed within the clutch chamber and rotatable with the crankshaft, and a unidirectional clutch for controlling unidirectional rotation of the wet clutch;

a transmission box unit disposed in proximity to the clutch unit; and lubricating oil disposed in the clutch unit and the crankshaft box unit;

wherein the crankshaft of the crankshaft box unit extends through the seal cover of the clutch unit, and has an insertion end portion extending into the transmission box unit, the crankshaft box unit further including a driven shaft disposed in the transmission box unit and having an oil-storing end portion that is sleeved coaxially on the insertion end portion of the crankshaft and that extends into the seal cover, the oil-storing end portion defining a lubricating space that receives the unidirectional clutch and that is filled with the lubricating oil, the unidirectional clutch being disposed outwardly of the seal cover.

Since the oil-storing end portion of the driven shaft extends into the seal cover, and defines the lubricating space for receiving the unidirectional clutch, and since the unidirectional clutch is disposed outwardly of the seal cover, the unidirectional clutch can be lubricated efficiently so as to allow for smooth rotation of the unidirectional clutch.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
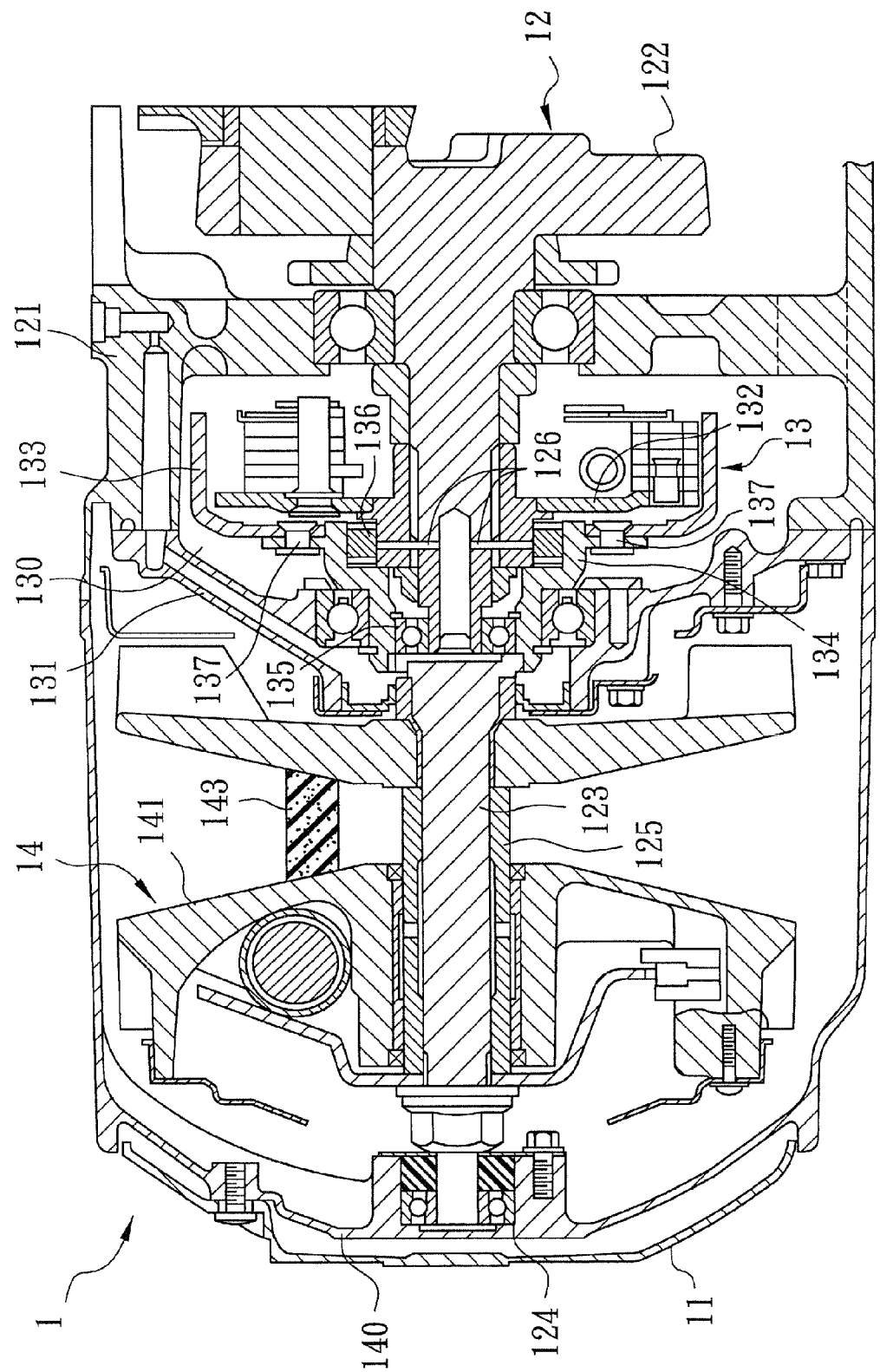
FIG. 1 is a fragmentary sectional view of a conventional vehicle transmission.

Before the present invention is described in greater detail in connection with the preferred embodiments, it should be noted that similar elements and structures are designated by like reference numerals throughout the entire disclosure.

Figure 2:
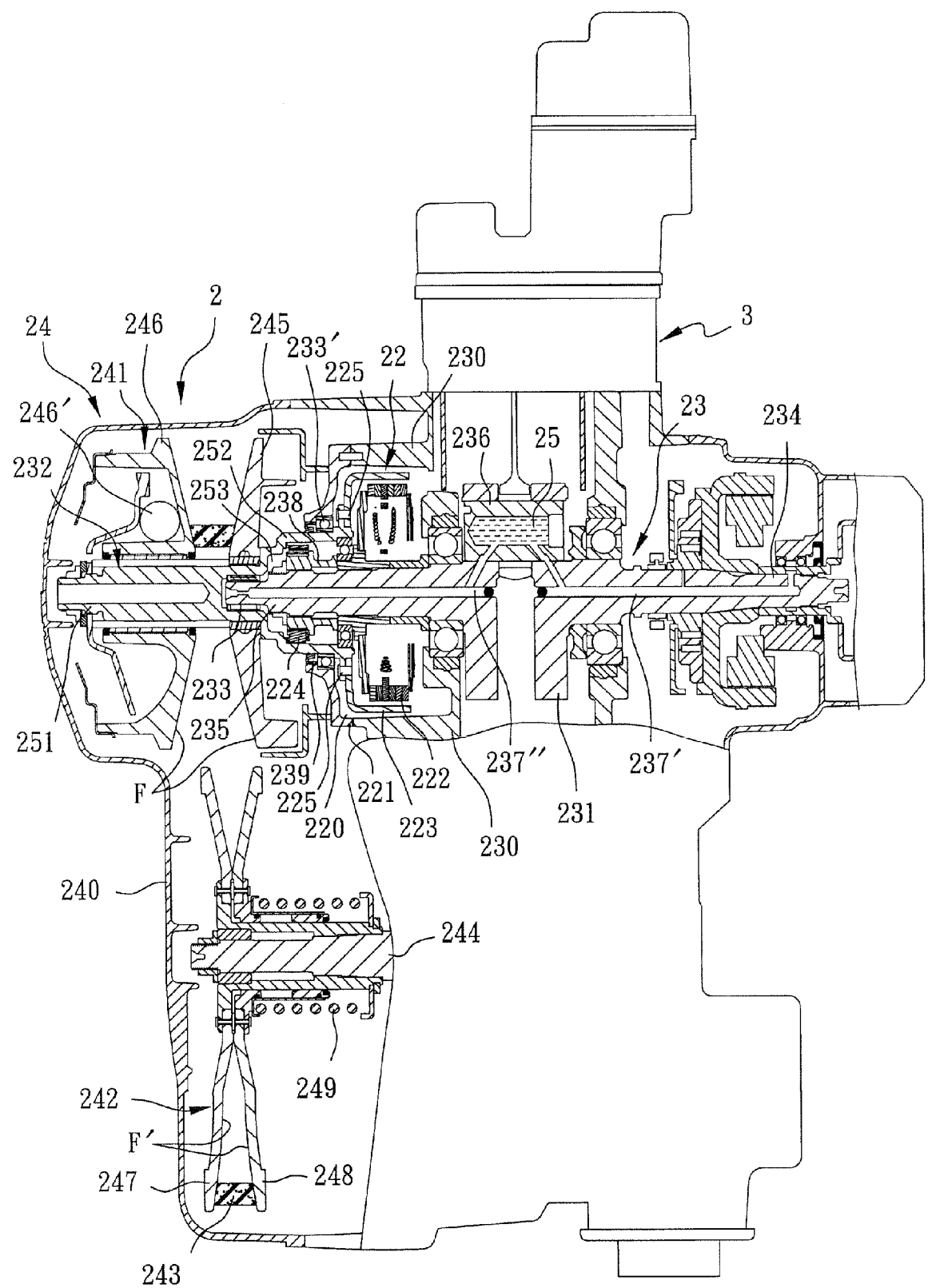
FIG. 2 is a schematic view of the first preferred embodiment of a vehicle transmission according to this invention.
Figure 3:
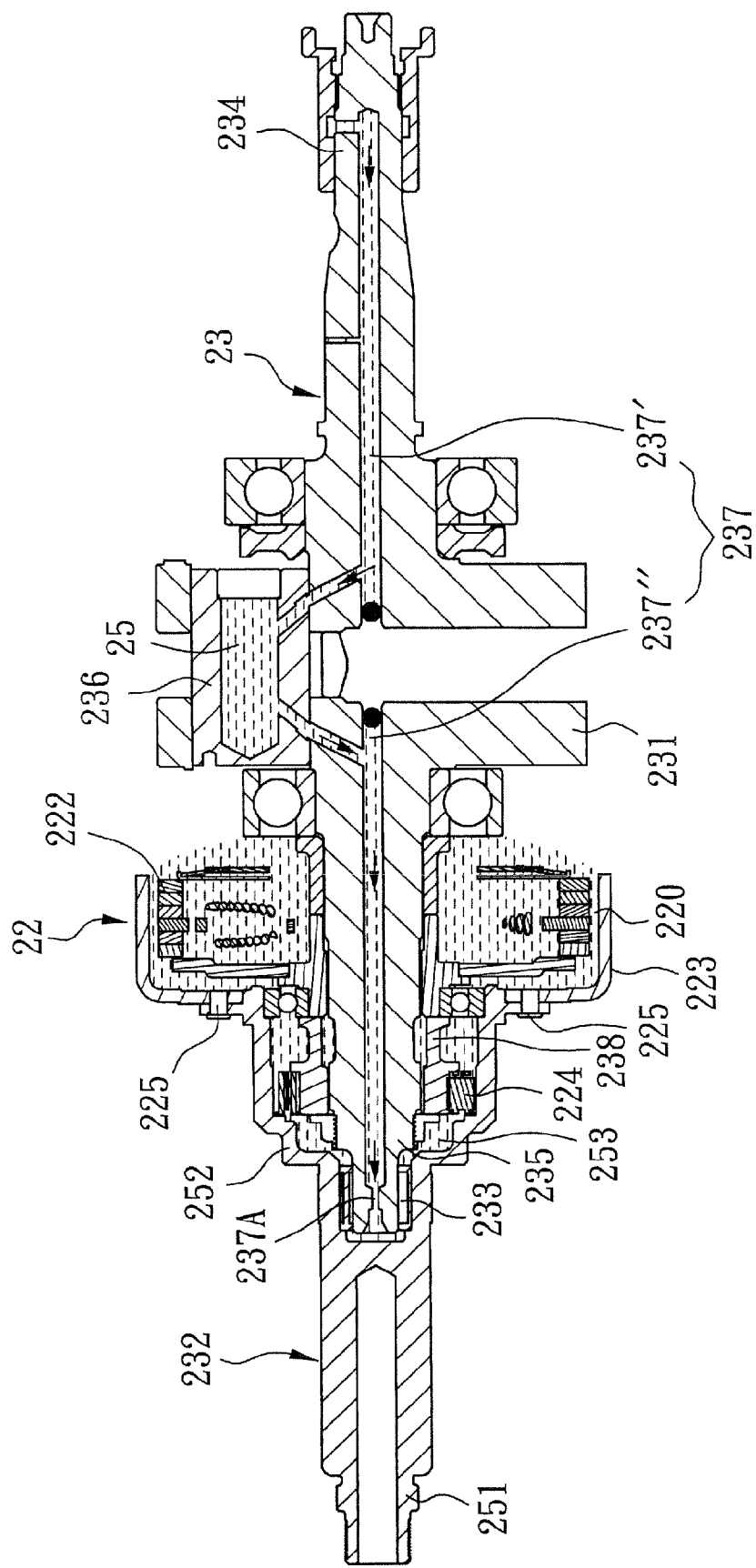
FIG. 3 is a fragmentary sectional view of the first preferred embodiment, illustrating flow paths of lubricating oil.

Referring to FIGS. 2 and 3, the first preferred embodiment of a vehicle transmission 2 according to this invention is suitable for a scooter, an all-terrain vehicle, etc., and is adapted for transmitting power from an engine 3 to a rear wheel (not shown).

The vehicle transmission 2 includes a clutch unit 22, a crankshaft box unit 23, a transmission box unit 24, and lubricating oil 25 disposed in the clutch unit 22 and the crankshaft box unit 23. Power can be transmitted from the engine 3 to the transmission box unit 24 via the crankshaft box unit 23 and the clutch unit 22 so as to rotate the rear wheel.

The clutch unit 22 is disposed in proximity to the crankshaft box unit 23, and includes a seal cover 221, a wet clutch 222, a bowl-shaped outer shield 223, and a unidirectional clutch 224. The seal cover 221 cooperates with the crankshaft box unit 23 to define a clutch chamber 220 therebetween. The wet clutch 222 is disposed within the clutch chamber 220, and is rotatable with the crankshaft 231 of the crankshaft box unit 23 in a known manner. The outer shield 223 is disposed in the clutch chamber 220, and has a central portion connected fixedly to the driven shaft 232 by rivets 225 (only two are shown), and an annular outer periphery disposed around the wet clutch 221 in a known manner. The unidirectional clutch 224 is used to control unidirectional rotation of the wet clutch 222.

The crankshaft box unit 23 further includes a crankshaft box 230, a driven shaft 232, a first bearing 233, a second bearing 233', a bushing 238, and an annular oil seal 239. The crankshaft 231 is journalled within the crankshaft box 230, and is rotatable by the engine 3. The driven shaft 232 is disposed in the transmission box unit 24, and extends through the seal cover 221. The crankshaft 231 is inserted into the driven shaft 232. The first bearing 233 is disposed between the crankshaft 231 and the driven shaft 232. The second bearing 233' is disposed between the driven shaft 232 and the seal cover 221. The unidirectional clutch 224 is located between the first and second bearings 233, 233'. The seal cover 221, the wet clutch 222, the outer shield 223, and the bushing 238 are sleeved on the crankshaft 231. In this embodiment, the first bearing 233 is configured as a roller bearing, and the second bearing 233' is configured as a ball bearing.

The driven shaft 232 has a positioning end portion 251 disposed rotatably in the transmission box unit 24, and an oil-storing end portion 252 that extends into the seal cover 221 and that is connected fixedly to the outer shield 223 by the rivets 225. The second bearing 233' is disposed between an inner surface of the seal cover 221 and an outer surface of the oil-storing end portion 252 of the driven shaft 232. The oil seal 239 is sleeved on the oil-storing end portion 252 of the driven shaft 232, and is clamped between the oil-storing end portion 252 of the driven shaft 232 and the seal cover 221. The oil-storing end portion 252 defines a lubricating space 253 that receives the unidirectional clutch 224 and the bushing 238, that is filled with the lubricating oil 25, and that is in fluid communication with the clutch chamber 220. The oil seal 239 is disposed in proximity to the second bearing 233' for preventing leakage of the lubricating oil 25 from the lubricating space 253 via the second bearing 233'. The unidirectional clutch 224 is disposed outwardly of the seal cover 221.

The crankshaft 231 extends through the seal cover 221, and has an open oil inlet end 234 and an open insertion end portion 235 opposite to the oil inlet end 234, a hollow conduit member 236, and an axial central passage unit 237. The insertion end portion 235 extends through the seal cover 221. The first bearing 233 is disposed between an outer surface of the insertion end portion 235 of the crankshaft 231 and an inner surface of the oil-storing end portion 252 of the driven shaft 232. The oil-storing end portion 252 is sleeved coaxially on the insertion end portion 235 of the crankshaft 231. The central passage unit 237 has an upstream passage portion 237' permitting flow of the lubricating oil 25 therethrough when the lubricating oil 25 is fed into the oil inlet end 234 of the crankshaft 231, and a downstream passage portion 237" spaced apart from and aligned with the upstream passage portion 237'. The conduit member 236 defines an elongated interior chamber, which is parallel to the upstream and downstream passage portions 237', 237" of the central passage unit 237 and which is communicated with the upstream and downstream passage portions 237', 237" so as to allow for flow of the lubricating oil 25 from the upstream passage portion 237' into the downstream passage portion 237" via the interior chamber in the conduit member 236.

The downstream passage portion 237" has a bearing-insertion end portion (237A) that forms a portion of the insertion end portion 235 of the crankshaft 231 and that is communicated with the first bearing 233. The bearing-insertion end portion (237A) has a diameter smaller than that of the remaining portion of the downstream passage portion 237" so as to throttle the flow rate of the lubricating oil 25 when flowing from the central passage unit 237 onto the first bearing 233. Alternatively, the diameter of the bearing-insertion end portion (237A) is the same as that of the remaining portion of the downstream passage portion 237", and a throttle valve is disposed within the bearing-insertion end portion (237A) for performing the same function of throttling the flow rate of the lubricating oil 25.

When the lubricating oil 25 is fed into the oil inlet end 234 of the crankshaft 231, it flows from the upstream passage portion 237' of the central passage unit 237 into the downstream passage portion 237" of the central passage unit 237 via the conduit member 236. Subsequently, the lubricating oil 25 flows from the downstream passage portion 237" into the lubricating space 253 and, thus, the clutch chamber 220 via the bearing-insertion end portion (237A) so as to lubricate the wet clutch 222, the unidirectional clutch 224, and the first and second bearings 233, 233'.

The transmission box unit 24 is disposed in proximity to the clutch unit 22, and includes a transmission box 240, a driving pulley unit 241, a driven pulley unit 242, a V-belt 243, and a coupling shaft 244. The insertion end portion 235 of the crankshaft 231 extends into the transmission box 240. The driving pulley unit 241 is disposed in the transmission box 240, and includes a fixed driving pulley half 245 sleeved fixedly on the driven shaft 232 and adjacent to the crankshaft box unit 23, and a movable driving pulley half 246 sleeved movably on the driven shaft 232 and disposed between the fixed driving pulley half 245 and a wall of the transmission box 240 in a known manner. In this embodiment, the crankshaft 231 extends through the fixed driving pulley half 245. When the rotational speed of the driven shaft 232 increases, a ball unit 246' moves outwardly (i.e., away from the driven shaft 232) by centrifugal force so as to move the movable driving pulley half 246 toward the fixed driving pulley half 245 in a known manner. This increases the pitch diameter of the driving pulley unit 241. When the rotational speed of the driven shaft 232 reduces, the movable driving pulley half 246 moves away from the fixed driving pulley half 245. This reduces the pitch diameter of the driving pulley unit 241. The fixed and movable driving pulley halves 245, 246 are formed with juxtaposed frusto-conical surfaces (F) facing each other in a known manner.

The coupling shaft 244 is journalled in the transmission box 240 under the driven shaft 232, and is connected fixedly to the rear wheel. The driven pulley unit 242 is also disposed in the transmission box 240, and includes a fixed driven pulley half 247 sleeved fixedly on the coupling shaft 244, a movable driven pulley half 248 sleeved movably on the coupling shaft 244, and a coiled compression spring 249 for biasing the movable driven pulley half 248 toward the fixed driven pulley half 247. The fixed and movable driven pulley halves 247, 248 are formed with juxtaposed frusto-conical surfaces (F') facing each other. The V-belt 243 is trained on the driving and driven pulley units 241, 242, and extends between the juxtaposed frusto-conical surfaces (F, F') of the fixed and movable driving pulley halves 245, 246, and of the fixed and movable driven pulley halves 247, 248. As such, rotation of the driving pulley unit 241 and the driven shaft 232 can be transferred to the driven pulley unit 242 and the coupling shaft 244. Operation of the transmission box unit 24 is similar to that of the aforesaid conventional vehicle transmission 1 (see FIG. 1), and will not be described in detail. The vehicle transmission 2 of this invention has the following advantages:

(1) Because the crankshaft 231 extends through the seal cover 221, the insertion end portion 235 of the crankshaft 231 can be mounted easily to the driven shaft 232. As a consequence, the vehicle transmission 2 can be assembled easily.

(2) The lubricating oil 25 is fed into the oil inlet end 234 of the central passage 237, and flows in the clutch unit 22 and the crankshaft box unit 23 along the flow paths indicated by the arrows in FIG. 3, thereby providing sufficient lubrication to rotating parts. In particular, since the unidirectional clutch 224 is disposed within the oil-storing end portion 252 of the driven shaft 232, and outwardly of the seal cover 221, an enhanced lubricating effect thereto and, thus, smooth rotation thereof are achieved.

Figure 4:
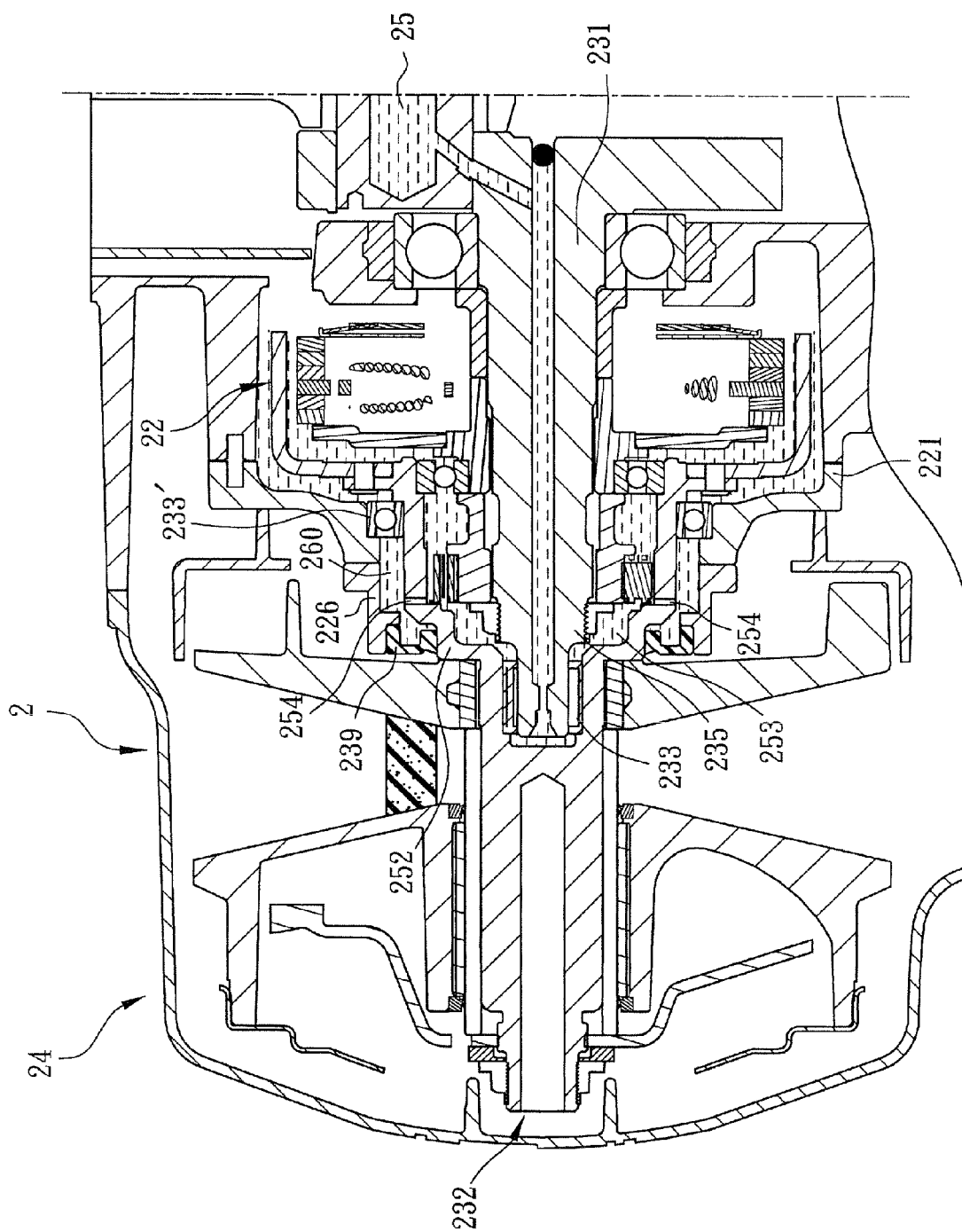
FIG. 4 is a fragmentary schematic view of the second preferred embodiment of a vehicle transmission according to this invention.

FIG. 4 shows the second preferred embodiment of a vehicle transmission 2 according to this invention, which is similar in construction to the first preferred embodiment. In this embodiment, the clutch unit 22 further includes a tubular oil seal seat 226 connected fixedly to the seal cover 221 and extending toward the transmission box unit 24. The oil seal 239 is sleeved on the oil-storing end portion 252 of the driven shaft 232, and is clamped between the oil-storing end portion 252 of the driven shaft 232 and the oil seal seat 226. As such, an oil chamber 260 is defined among the oil-storing end portion 252 of the driven shaft 232, the oil seal seat 226, the oil seal 239, and the second bearing 233'. The oil-storing end portion 252 of the driven shaft 232 has a wall formed with two through holes 254 in communication with the lubricating space 253 and the oil chamber 260. This allows the lubricating oil 25 to flow from the lubricating space 253 into the oil chamber 260 via the through holes 254 for lubricating the second bearing 233'. This further improves the lubricating effect to thereby increase the service life of the vehicle transmission. Furthermore, due to the presence of the oil seal seat 226, the diameter of the oil seal 239 can be reduced slightly. When the diameter of the oil seal 239 is reduced, the deformation of the same is also reduced during operation.

With this invention thus explained, it is apparent that numerous modifications and variations can be made without departing from the scope and spirit of this invention. It is therefore intended that this invention be limited only as indicated by the appended claims.

I claim:

1. A vehicle transmission comprising:

a crankshaft box unit including a crankshaft box and a crankshaft journalled within said crankshaft box;

a clutch unit disposed in proximity to said crankshaft box unit and including a seal cover cooperating with said crankshaft box to define a clutch chamber therebetween, a wet clutch disposed within said clutch chamber and rotatable with said crankshaft, and a unidirectional clutch for controlling unidirectional rotation of said wet clutch;

a transmission box unit disposed in proximity to said clutch unit; and lubricating oil disposed in said clutch unit and said crankshaft box unit;

wherein said crankshaft of said crankshaft box unit extends through said seal cover of said clutch unit, and has an insertion end portion extending into said transmission box unit, said crankshaft box unit further including a driven shaft disposed in said transmission box unit and having an oil-storing end portion that is sleeved coaxially on said insertion end portion of said crankshaft and that extends into said seal cover, said oil-storing end portion defining a lubricating space that receives said unidirectional clutch and that is filled with said lubricating oil, said unidirectional clutch being disposed outwardly of said seal cover;

wherein said crankshaft box unit further includes:

a first bearing disposed between an outer surface of said insertion end portion of said crankshaft and an inner surface of said oil-storing end portion of said driven shaft and outwardly of said crankshaft box; and a second bearing disposed between an inner surface of said seal cover and an outer surface of said oil-storing end portion of said driven shaft, said unidirectional clutch being located between said first and second bearings; and wherein said crankshaft includes:
an axial central passage unit having an upstream passage portion permitting flow of said lubricating oil therethrough when said lubricating oil is fed into said crankshaft, and a downstream passage portion spaced apart from and aligned with said upstream passage portion and having a bearing-insertion end portion that forms a portion of said insertion end portion of said crankshaft and that is communicated with said lubricating space in said oil-storing end portion of said driven shaft of said crankshaft box unit; and
a hollow conduit member defining an elongated interior chamber that is parallel to said upstream and downstream passage portions of said central passage unit and that is communicated with said upstream and downstream passage portions of said central passage unit so as to allow for flow of said lubricating oil from said upstream passage portion into said downstream passage portion via said interior chamber in said conduit member.

2. The vehicle transmission as claimed in claim 1, wherein said crankshaft box unit further includes a bushing sleeved on said insertion end portion of said crankshaft, said unidirectional clutch being sleeved on said bushing.

3. The vehicle transmission as claimed in claim 2, wherein said first bearing of said crankshaft box unit is configured as a roller bearing.

4. The vehicle transmission as claimed in claim 3, wherein said clutch unit further includes an outer shield disposed in said clutch chamber and having an annular outer periphery disposed around said wet clutch, said outer shield being connected fixedly to said driven shaft.

5. The vehicle transmission as claimed in claim 4, wherein said transmission box unit includes:
a transmission box;
a driving pulley unit disposed in said transmission box and rotatable by said crankshaft, said driving pulley unit including a fixed driving pulley half sleeved fixedly on said driven shaft, and a movable driving pulley half sleeved movably on said driven shaft, said movable driving pulley half being movable toward said fixed driving pulley half when a rotational speed of said driven shaft increases, said movable driving pulley half being movable away from said fixed driving pulley half when the rotational speed of said driven shaft reduces, said fixed and movable driving pulley halves having juxtaposed frusto-conical surfaces facing each other;
a coupling shaft journalled in said transmission box;
a driven pulley unit disposed in said transmission box and including a fixed driven pulley half sleeved fixedly on said coupling shaft, and a movable driven pulley half sleeved movably on said coupling shaft, said fixed and movable driven pulley halves having juxtaposed frusto-conical surfaces facing toward each other;
a V-belt trained on said driving and driven pulley units and extending between said juxtaposed frusto-conical surfaces of said fixed and movable driving pulley halves and of said fixed and movable driven pulley halves so as to transfer rotation of said driving pulley unit to said driven pulley unit; and
a spring for biasing said movable driven pulley half toward said fixed driven pulley half.

6. The vehicle transmission as claimed in claim 5, wherein said insertion end portion of said crankshaft of said crankshaft box unit extends through said fixed driving pulley half of said driving pulley unit of said transmission box unit.

7. The vehicle transmission as claimed in claim 1, wherein said bearing-insertion end portion of said downstream passage portion of said central passage unit in said crankshaft has a diameter that is smaller than that of the remaining portion of said downstream passage portion so as to throttle a flow rate of said lubricating oil when flowing from said central passage unit into said lubricating space in said oil-storing end portion of said driven shaft.

8. The vehicle transmission as claimed in claim 1, wherein:
said clutch unit further includes a tubular oil seal seat connected fixedly to said seal cover and extending toward said transmission box unit; and
said crankshaft box unit further includes a first bearing disposed between an outer surface of said insertion end portion of said crankshaft and an inner surface of said oil-storing end portion of said driven shaft, a second bearing disposed between an inner surface of said seal cover and an outer surface of said oil-storing end portion of said driven shaft, and an annular oil seal sleeved on said oil-storing end portion of said driven shaft and clamped between said oil-storing end portion of said driven shaft and said oil seal seat so as to define an oil chamber among said oil-storing end portion of said driven shaft, said oil seal seat, said oil seal, and said second bearing, said unidirectional clutch being located between said first and second bearings.

9. The vehicle transmission as claimed in claim 8, wherein said oil-storing end portion of said driven shaft has a wall formed with a through hole in fluid communication with said lubricating space and said oil chamber.

10. The vehicle transmission as claimed in claim 8, wherein said crankshaft box unit further includes a bushing sleeved on said insertion end portion of said crankshaft, said unidirectional clutch being sleeved on said bushing.

11. The vehicle transmission as claimed in claim 8, wherein said first bearing of said crankshaft box unit is configured as a roller bearing.

12. The vehicle transmission as claimed in claim 8, wherein said clutch unit further includes an outer shield disposed in said clutch chamber and having an annular outer periphery disposed around said wet clutch, said outer shield being connected fixedly to said driven shaft.

13. The vehicle transmission as claimed in claim 8, wherein said transmission box unit includes:
a transmission box;
a driving pulley unit disposed in said transmission box and rotatable by said crankshaft, said driving pulley unit including a fixed driving pulley half sleeved fixedly on said driven shaft, and a movable driving pulley half sleeved movably on said driven shaft, said movable driving pulley half being movable toward said fixed driving pulley half when a rotational speed of said driven shaft increases, said movable driving pulley half being movable away from said fixed driving pulley half when the rotational speed of said driven shaft reduces, said fixed and movable driving pulley halves having juxtaposed frusto-conical surfaces facing each other;
a coupling shaft journalled in said transmission box;
a driven pulley unit disposed in said transmission box and including a fixed driven pulley half sleeved fixedly on said coupling shaft, and a movable driven pulley half sleeved movably on said coupling shaft, said fixed and movable driven pulley halves having juxtaposed frusto-conical surfaces facing toward each other;
a V-belt trained on said driving and driven pulley units and extending between said juxtaposed frusto-conical surfaces of said fixed and movable driving pulley halves and of said fixed and movable driven pulley halves so as to transfer rotation of said driving pulley unit to said driven pulley unit; and a spring for biasing said movable driven pulley half toward said fixed driven pulley half.

14. The vehicle transmission as claimed in claim 13, wherein said insertion end portion of said crankshaft of said crankshaft box unit extends through said fixed driving pulley half of said driving pulley unit of said transmission box unit.

15. The vehicle transmission as claimed in claim 8, wherein said crankshaft includes:

an axial central passage unit having an upstream passage portion permitting flow of said lubricating oil therethrough when said lubricating oil is fed into said crankshaft, and a downstream passage portion spaced apart from and aligned with said upstream passage portion and having a bearing-insertion end portion that forms a portion of said insertion end portion of said crankshaft and that is communicated with said lubricating space in said oil-storing end portion of said driven shaft of said crankshaft box unit; and a hollow conduit member defining an elongated interior chamber that is parallel to said upstream and downstream passage portions of said central passage unit and that is communicated with said upstream and downstream passage portions of said central passage unit so as to allow for flow of said lubricating oil from said upstream passage portion into said downstream passage portion via said interior chamber in said conduit member.

16. The vehicle transmission as claimed in claim 15, wherein said bearing-insertion end portion of said downstream passage portion of said central passage unit in said crankshaft has a diameter that is smaller than that of the remaining portion of said downstream passage portion so as to throttle a flow rate of said lubricating oil when flowing from said central passage unit into said lubricating space in said oil-storing end portion of said driven shaft.

* * * * *